Sept. 7, 1965 B. BRIGHTMAN ETAL 3,205,312

OFF-HOOK DETECTOR

Filed Dec. 23, 1960

INVENTORS.
BARRIE BRIGHTMAN
J. CARTER PERKINS, JR.
RICHARD SCOTT

BY George W. Killian
AGENT 3,205,312
OFF-HOOK DETECTOR

Barrie Brightman, Webster, J. Carter Perkins, Jr., Victor, and Richard Scott, Rochester, N.Y., assignors to General Dynamics Corporation, Rochester, N.Y., a corporation of Delaware Filed Dec. 23, 1960, Ser. No. 78,091
11 Claims. (Cl. 179—18)

This invention relates in general to signal responsive control systems and, more particularly, to signal responsive control systems for use in an electronic telephone exchange.

Although the invention described herein is suitable for more general application, it is particularly suitable for use in an electronic telephone exchange. In any telephone system employing subscriber operated pulse generators, such as dials, there is a need to include equipment in the central office which can differentiate between the opened and closed condition of the pulsing contacts at all times. In addition, the detection equipment must be capable of determining the on- or off-hook condition of a telephone connected to a given line. As is well known to those familiar with the telephone art, dial pulses, as seen from the central office, are substantially the same as alternating on- and off-hook signals. Therefore, the major requirement of the referenced detector circuit is to detect if a telephone connected to a particular line appears to have an on- or off-hook condition. Conventional telephone systems, such as those widely used today, employ a relay which is capable of pulsing at dial speeds for detecting dial pulses. Although a particular pulsing relay may, as occasion demands, be assigned to operate with various lines, it is operable with only one line at a time. Electronic telephone systems which have been proposed have employed the same basic design philosophy. Thus, each line that is engaged in setting up a telephone connection has assigned thereto an individual circuit which detects the on- or off-hook condition of the assigned line.

It is a general object of this invention to provide a new and improved signal responsive control system.

It is a more particular object of this invention to provide sequential signals from a plurality of circuits to a common detector circuit, over a time sharing transmission network, which are indicative of predetermined states in each of said plurality of circuits.

It is another object of this invention to provide an improved time sharing transmission network telephone system wherein a single detector is used for sequentially indicating the on-hook or off-hook condition existing on each of a plurality of telephone lines.

In accordance with the present invention, as applied to an electronic telephone system, each line of a group of lines is coupled to a time division multiplex highway at one end thereof and a common off-hook and impulse detector circuit is coupled to the other end of the highway. The impedance of a subscriber's line varies between two different values depending upon the on- or off-hook condition of the line. The prevailing impedance value of the line is reflected to a winding of a transformer which is connected as a load to a capacitor. The capacitor is periodically charged to a reference potential and the energy remaining in the capacitor after a predetermined time interval is, of course, determined by the rate at which the energy stored in the capacitor is dissipated by the transformer winding connected thereto. Thus, the capacitor which starts with a predetermined reference charge will, after a predetermined time interval, have the charge thereon reduced by various amounts as determined by the variable impedance of the transformer winding connected as a load to the capacitor.

Periodically the resultant charge on the line circuit capacitor is transferred to a capacitor in the common off-hook detector. Within the off-hook detector circuit the potential across the terminals of the capacitor to which the charge was transferred will be compared with a reference potential in order to obtain a signal which is indicative of the charge that remained in the line circuit capacitor after a predetermined period of time. The signal thus obtained is, of course, a manifestation of the value of the impedance of the winding of the transformer and therefore is indicative of the on- or off-hook condition of the associated line.

In order to carry out this invention, the common detector circuit is controlled by clock pulses in a manner which is well known in time division multiplex switching systems. Clock pulses operating gate circuits are used to sequentially and cyclically connect each line circuit to one end of the highway. Thus, as each line circuit is connected to the highway, a capacitor therein is charged to a known potential and discharged for a predetermined period of time through an impedance having a value determined by the on- or off-hook condition of the associated line. The remaining charge is transferred to the common detector circuit and compared with a reference potential to ascertain the on- or off-hook condition of the respective lines. By driving the detector circuit at a sufficiently high frequency, the frequency with which each line in a group of lines is examined may easily be made large enough to reliably detect dialing pulses emanating from a line as well as to detect simple on- or off-hook conditions.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise two figures on one sheet.

Figures 1, 2:
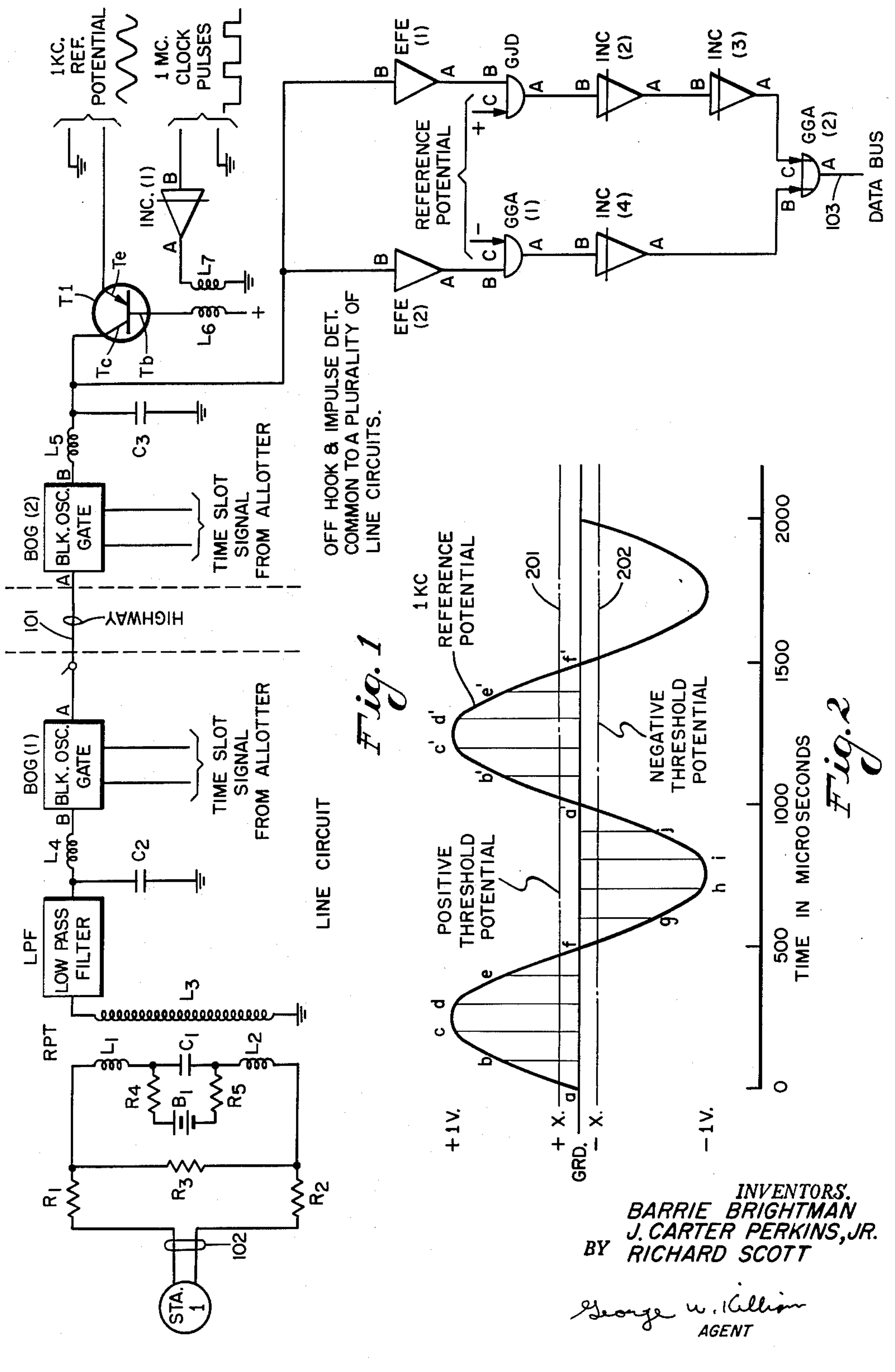
FIG. 1 shows a block diagram of the invention using conventional logic symbols.
FIG. 2 shows details of the sampling of the one kilocycle reference potential.

It is to be understood that only the details of the circuit necessary to understand the invention have been shown. For example, in order to more clearly and distinctly illustrate the principles of this invention, and for the convenience of one examining the circuit of this invention, the drawings employ conventional logic symbols rather than showing trivial circuit details which would only tend to mask, or obscure, the true invention.

Typical circuits for various logic symbols are shown in Patent 2,933,564 to Pearce et al. For example, the blocking oscillator gate circuits BOG(1) and BOG(2) are shown in detail in the referenced patent as FIGURES 6A and 6B in logic and conventional circuit component symbolism, respectively. In the same manner, the diagrams for emitter-follower circuits EFE, the inverter amplifiers INC, and gate circuits GGA and GJD are shown in the referenced patent in FIGURES 10, 20, 15 and 16, respectively.

A blocking oscillator gate circuit comprises a diode bridge circuit in which the individual diodes of the bridge are normally biased in the reverse direction so as to present a very high impedance and thus prevent the transfer of energy between the terminals designated B and A. The bridge diodes are biased in the forward direction to present a very low impedance and thus permit the transfer of energy between terminals B and A only when the blocking oscillator transistor is conductive. The blocking oscillator transistor is triggered into conduction by the trailing edge of a time position defining negative input potential applied across terminals C and D and the time constant of the blocking oscillator is such that the gate is conductive and the bridge diodes are biased in the forward direction for a predetermined period of time regardless of the duration of the negative input pulse.

EFE represents an emitter-follower circuit which produces an output at A in response to an input signal at terminal B without a phase inversion.

INC represents an inverter amplifier which provides an output signal at terminal A opposite in polarity to the input at terminal B.

GJD represents an AND gate in which input terminal C is connected to a positive D.C. reference potential and which will produce a positive output potential at terminal A only when the input at terminal B is more positive than the D.C. reference potential at point C. The closed arrow at C denotes a resistor input.

GGA(1) represents an AND gate which is similar to gate GJD except that a negative D.C. reference potential is connected to input terminal C, and a negative ouput signal will be produced at terminal A only when the input signal at terminal B is more negative than the negative D.C. reference potential.

GGA(2) represents an OR gate which will produce a positive signal at terminal A whenever a positive signal is applied to either input terminal.

It is believed that the operation of this invention can best be understood by describing the operation of a system employing applicants' invention. For this purpose, assume that a telephone subscriber at station 1 desires to complete a telephone connection through the system to another station, not shown. Station 1 is provided with access to the time division multiplex highway 101 through its associated line circuit which includes blocking oscillator gate BOG(1) and a low-pass filter LPF together with a repeat coil RPT which, in turn, comprises inductors L1, L2, and L3. The subscriber's line 102, which connects the subscriber's station and the line circuit, includes a certain amount of loop resistance, as represented by resistors R1 and R2, and has a leakage resistance, as represented by resistor R3. Current is provided from the line circuit to the subscriber's station over the line 102 from a power source, B1, through impedances R4 and R5.

An off-hook and impulse detector circuit is coupled to the time division multiplex highway 101 by means of blocking oscillator gate circuit BOG(2). A plurality of line circuits, identical to the one shown, may be coupled to the time division multiplex highway by means of individual blocking oscillator gate circuits. Each line circuit may be sequentially and periodically connected to the common off-hook and impulse detector via the TDM highway by sequentially and periodically applying a pulse to the BOG circuit of each line circuit. The techniques for generating and applying the pulses to the respective BOG circuits of each line circuit does not form a part of this invention and, therefore, is not shown in this application. For a detailed explanation of the operation of a typical pulse generator and associated multiplexing equipment, reference may be had to the cited Pearce et al patent.

As is well known, the dial of a standard telephone includes a pair of normally closed contacts which open a number of times corresponding to the digit dialed. During the process of dialing, the referenced contacts are in a circuit which serves to open and close a connection across the two-conductor loop 102 between the telephone instrument and the central office. Accordingly, the impedance of a subscriber's loop, as seen from the central office, varies between a minimum value which is effectively the loop resistance of the line, and a maximum value which is effectively the leak resistance between the conductors of the line, as the dial contacts close and open, respectively. In a similar manner, when the handset of a subscriber's telephone set is lifted, or in telephone parlance, when the set is off-hook, the subscriber's loop is closed, while when the set is on-hook, the subscriber's loop is open. However, if the line is of appreciable length, the impedance of the line, as seen from the central office, will be the characteristic impedance of the line and, therefore, will not be affected by the on- or off-hook condition of the line. Accordingly, the present invention, as described, functions only with lines that are not long enough to exhibit their characteristic impedance. For longer lines, separate means, not described herein, have been developed for obtaining suitable indications at the central office of their on- or off-hook condition.

Since dialing is in effect only a controlled opening and closing of the subscriber's loop at a predetermined rate, the dial is actually producing periodic pulses of on- and off-hook supervision. Thus, in reality, only two conditions may exist at the subscriber's station and all that is required of the central office equipment is to determine which condition exists at a particular point in time, and to evaluate the resultant information in the light of what had happened a short time previously in order to determine if a particular signal is an on-hook signal or represents a disconneect signal, or possibly part of a dial pulse.

If an A.C. potential is connected across the terminals of inductor L3 of repeat coil RPT, a relatively small current will flow if the loop is on-hook, while a relatively large current will flow if the loop is off-hook. That is, the relatively high impedance of the line when a subscriber's set is on-hook will be reflecteed to winding L3 of the repeat coil RPT and permit only a relatively small current; while the relatively low impedance of a short loop when the subscriber's set is off-hook will be reflected to winding L3 of the repeat coil and permit a larger current.

It is known in the prior art to transfer information from one locality to another in time sharing or time division multiplex systems in a manner which permits the simultaneous exchange of information between each one of a plurality of communication terminals and a corresponding one of a remote plurality of terminals over a common transmission link. Such systems require that in successive short time intervals each pair of terminals which are arranged to be in communication with each other be assigned a cyclically recurring discrete time slot during which information may be sampled and received. During the relatively long interval between the cyclically recurring discrete time slots, the common transmission highway is available and may be used by other pairs of terminals which are arranged to be in communication with each other, and they may use the highway during their cyclically recurring discrete time slot to transfer information therebetween. By using appropriate filtering and a sufficiently rapid rate of sampling, an accurate reproduction of the information transmitted from each station of a communicating pair may be transmitted to the other station of the pair.

The present invention utilizes these known techniques to provide on-hook and off-hook supervisory signals from a plurality of lines to a common data bus 103. However, only one off-hook and impulse detector is required rather than one per line circuit. The common off-hook and impulse detector circuit hereinafter referred to as the detector circuit for convenience, is sequentially and cyclically connected to a predetermined line circuit for the brief interval corresponding to the particular time slot assigned to said line circuit. Other time slots are assigned to other line circuits and, during their respective time slots, the detector is connected thereto.

By using the TDM techniques reviewed above, the circuit of the present invention transfers a reference A.C. potential to the line circuit to obtain a signal indicative of the impedance of winding L3 of the repeat coil, which, as shown above, is indicative of the on- or off-hook condition of the associated line. The signal which is returned to the detector circuit is compared with a reference and, if the returned potential is greater than the reference potential, a signal is passed to a data bus to indicate the line is on-hook; while, if the returned potential is less than the reference potential, no signal is passed to the data bus, thereby indicating an off-hook condition.

The frequency with which a signal indicative of the on- or off-hook condition of a particular line is placed on the data bus is, of course, a function of the sampling frequency and the number of lines that the detector is testing. A sampling rate which permits testing each line once per one hundred microseconds is a convenient and practical rate. A typical dial produces pulses at not over twelve pulses per second, thereby giving a total of somewhat over eighty milliseconds per pulse. The on-hook or off-hook time in a practical case will not be less than thirty-one milliseconds, or thirty-one thousand microseconds. Since a signal indicative of the on- or off-hook condition of a line is obtained once per one hundred microseconds, there may be at least three hundred and ten signals on the data bus for each individual on- or off-hook signal. Accordingly, if a few of these three hundred and ten signals are improperly received or indicated on the data bus, no harm will be done as long as the interpreting circuit, which does not form a part of this invention, produces its interpreting signal only after examining the particular time slot of the data bus for a period of time which is relatively long as compared with the sampling rate and produces a signal which is indicative of the trend of the signals on the data bus.

DETAILED DESCRIPTION OF PREFERRED EMBODIMENT

For convenience in this detailed description, certain frequencies and potential levels will be assumed. Of course, it is obvious that other frequencies or potentials may be employed without departing from the spirit of this invention and, therefore, the stated magnitudes should be considered as illustrative only.

Negative going clock pulses generated at a one megacycle frequency are applied to the input terminal B of inverter amplifier INC(1). Each negative pulse which lasts 0.6 microsecond drives the upper terminal of ground connected inductor L7 to a negative potential. By transformer action, the upper terminal of inductor L6 is made negative, thereby turning on the PNP transistor T1 by driving its base negative with respect to its emitter. With transistor T1 turned on, capacitor C3 will be charged to the instantaneous potential of the one kilocycle reference potential connected to the emitter $T_e$ of the transistor. The one kilocycle reference potential is essentially a sine wave potential with equal positive and negative excursions above and below ground. The negative excursions do not exceed the negative potential applied to the base of the transistor, and therefore any instantaneous value of the reference potential may be passed through the transistor. Since the clock pulses are one megacycle pulses and the reference potential is a one kilocycle signal, the reference potential is sampled one thousand times per cycle of reference potential.

By means of the techniques known in the art and outlined above, the potential on capacitor C3 may be transferred to capacitor C2. The transferring or sampling is done in accordance with signals from the one megacycle clock pulse source and, of course, is accomplished during the period that transistor T1 is not conducting. As already stated, capacitor C3 is charged during the negative pulses. Therefore, transfer is accomplished during the ground pulses which are 0.4 microsecond in duration. The BOG(2) circuit of the detector is enabled by the ground pulses each cycle, while successive cycles are used to enable the BOG circuits in successive line circuits. It is assumed that one hundred line circuits are provided for and therefore a particular line circuit will be connected, via highway 101, to the detector once every one hundred microseconds; or a predetermined line circuit is connected to the highway ten times per cycle of the one kilocycle reference potential. Accordingly, the transfer means and the sequential and cyclical enabling of the BOG circuits in the line circuits are effective to transfer to the upper terminal of capacitor C2 in each line circuit a signal which effectively reproduces the A.C. reference potential. That is, capacitor C2 is sequentially charged to different potentials and the envelope enclosing the potentials transferred to capacitor C2 would be identical to the one kilocycle reference potential.

After a potential has been transferred to capacitor C2 in a line circuit, a different potential will not be transferred thereto for ninety-nine microseconds. During these ninety-nine microseconds, capacitor C2 will tend to discharge through inductor L3. Accordingly, the potential remaining on capacitor C2 at the end of the ninety-nine microseconds is a function of the impedance of inductor L3, which, in turn, is a function of the on- or off-hook condition of the connected line.

During the time that a new potential is being transferred to capacitor C2, the remaining potential from the former charge is transferred to capacitor C3. The potential, be it positive or negative, transferred back to the detector circuit will be closest to the value originally transferred to the line circuit capacitor if the line was on-hook. If the line had been off-hook, the potential, be it positive or negative, transferred back to the detector circuit will be ground potential plus or minus a very small limit. Accordingly, if the potential transferred back to the detector is either above or below the potential threshold limits near ground potential, it will be an indication that the subscriber's line was on-hook. It will be apparent that at times the potential transferred back to the detector will indicate the associated line is off-hook when, in fact, it was on-hook. This may happen, for example, when the absolute value of the potential transferred from the detector to the line circuit is equal to, or only slightly more than, the absolute value of the threshold voltage referred to above. However, such false indications, even though periodic, are of no consequence as the ultimate use circuit examines the trend rather than the instantaneous value of the signals to determine the true state of affairs.

During each cycle of the one megacycle clock pulses when a potential is transferred back to the detector, from a line circuit, the returned potential is applied to the input of emitter-follower circuits EFE(1) and FEF(2). The output signal of these emitter-followers is then applied to gate circuits GGA (1) and GJD, respectively. If the output of the emitter-followers is positive, AND gate GGA(1) does not pass a signal as its reference potential is negative; if the output of the emitter-follower is negative, AND gate GJD does not pass a signal as its reference potential is positive. That is, AND gate GJD passes only positive signals whose potential is equal to or greater than the positive reference potential, while AND gate GGA(1) passes only negative signals whose potential is equal to or more negative than the negative reference potential. The positive and negative reference potential at gates GJD and GGA(1) are equal, respectively, to the positive and negative values of the threshold potential referred to above. Therefore, if the signal returned to the detector is a definite on-hook indication, a signal will be passed through one or the other of the AND gate circuits to inverter amplifier INC(2) or INC(4), as the case may be, with the output of the former being a negative signal while the output of the latter would be a positive signal. Inverter amplifier INC(3) is used to obtain an ultimate positive output signal in response to any signal passed through gate GJD. Thus, in response to the passage of a signal through either AND gate GGA(1) or GJD, a positive signal is applied to one of the inputs of OR gate GGA-(2), thereby providing a signal to data bus 103 in an appropriate time slot position.

Referring now in more detail to FIGURE 2, there is shown therein a sine wave curve representing the waveform of the one kilocycle reference potential. As previously shown, this curve is sampled once per microsecond under control of the one megacycle clock pulses with a detector presumed to serve one hundred line circuits. This means that each line circuit receives a signal from the reference potential once every one hundred microseconds. Vertical lines headed *a*, *b*, *c*, etc., are drawn to represent the instantaneous values of the reference potential at the various times a predetermined line circuit receives sample signals from the reference potential.

It is well known that a charged capacitor when connected to a load will discharge at a rate determined by the time constant of the circuit. The values of the circuit parameters are so chosen that when the subscriber's line is off-hook, the charge remaining on capacitor C2 at the end of the ninety-nine microsecond discharge period is negligible compared with the maximum potential to which capacitor C2 may have been charged. If it is assumed that the maximum potential remaining on capacitor C2 at the end of a ninety-nine microsecond discharge period, with the line off-hook, is X volts, then any potential above this value will represent a definite on-hook indication. Thus, a positive voltage on capacitor C3 after a transfer from a line circuit, which is greater than X volts above ground, will represent a definite on-hook signal. This positive threshold potential is shown in FIGURE 2 as line 201. A similar negative threshold potential is shown in FIGURE 2 as line 202. It will be evident from a consideration of the above facts and an examination of FIGURE 2 that because of the particular instantaneous value of the reference potential transferred to a line circuit capacitor C2, that the potential signal returned to the detector will occasionally indicate an off-hook condition when the line is in fact on-hook. However, further consideration will show that this will happen so seldom per line that the majority of signals will indicate the true line conditions. Accordingly, by having the ultimate use circuit examine the trend of the signals rather than examine an individual signal, no false interpretation will result.

In summary, the present invention illustrates new and improved means for detecting the on- or off-hook conditions of the various lines in an electronic telephone system, and particularly shows a single detector capable of sequentially determining the on- or off-hook conditions of a plurality of lines.

Although the system described above is discussed in connection with particular quantities, frequencies, and potentials, it should be understood that other values and modifications will readily occur to those skilled in the art without departing from the true spirit and scope of the principles employed in the present invention.

What is claimed and desired to be secured by Letters Patent of the U.S. is:

1. A signal responsive control system comprising at least one first circuit and a second circuit, a common transmission line, first coupling means for periodically coupling said first circuit to one end of said common transmission line, second coupling means for coupling said second circuit and an energy source to the other end of said transmission line, said first circuit including an impedance element which is selectively adjustable to first and second mutually exclusive impedance values, transfer means in said second circuit for transferring electrical energy from said energy source to said first circuit as it is periodically coupled to said transmission line, said impedance element dissipating between successive couplings of said first circuit to said transmission line a proportion of the electrical energy transferred to said first circuit which is determined by the said impedance value thereof, transfer means in said first circuit for transferring a proportion of the energy not dissipated by said impedance element back to said second circuit when said first circuit is next coupled to said transmission line, and said second circuit further including detecting means responsive to the receipt of said transferred signal for providing an output signal indicative of the impedance value of the impedance element.

2. The system set forth in claim 1 wherein said first and second coupling means comprise individual gate circuits.

3. The system set forth in claim 2 wherein said second circuit further includes a pulse source, and control means, said control means having an input terminal, an output terminal, and a control terminal, said energy source coupled to said control terminal, and said output terminal coupled to said second gate circuit, whereby said control means passes signals from said energy source to said second gate circuit which are indicative of the instantaneous potential of said energy source, once per cycle of said pulse source.

4. The system set forth in claim 1 wherein measuring means are included in said second circuit for measuring a quantity of electrical energy proportional to the instantaneous potential of said energy source to be transferred to the first circuit then coupled to said transmission line.

5. The system set forth in claim 4 wherein said measuring means includes a capacitor coupled to said second means, a pulse controlled gate circuit having an output terminal, an input terminal, and a control terminal, said output terminal coupled to said capacitor, and a source of control pulses coupled to the control terminal of said controlled gate circuit, whereby said capacitor is charged from said energy source only while said control gate circuit is enabled by pulses from said source of control pulses.

6. A signal responsive control system comprising at least one first circuit and a second circuit, a common transmission line, first coupling means for periodically coupling said first circuit to one end of said common transmission line, second coupling means for coupling said second circuit and an energy source to the other end of said common transmission line, said first circuit including an impedance element which is selectively adjustable to first and second mutually exclusive impedance values, bilateral transfer means in said first and second coupling means for transferring electrical energy from said energy source to the impedance element of said first circuit as it is periodically coupled to said one end of said common transmission line, said impedance element dissipating between successive couplings of said first circuit to said transmission line a proportion of the electrical energy transferred thereto at a dissipating rate which is determined by the said impedance value thereof, said transfer means further transferring from the first circuit to said second circuit a signal which is indicative of the impedance value of the impedance element in the first circuit, and said second circuit further including detecting means responsive to said transferred signal for providing an output indicative of the impedance value of the impedance element.

7. The system set forth in claim 6 wherein said transfer means in said second circuit is adapted to transfer a measured quantity of energy, derived from and determined by the instantaneous potential of said energy source, to said connected first circuit.

8. The system set forth in claim 6 wherein said detecting means provides an output only in response to the receipt of a transferred signal thereat whose absolute potential is greater than a predetermined threshold potential.

9. A signal responsive control system comprising at least one first circuit and a second circuit, a common transmission line, first coupling means for periodically coupling said first circuit to one end of said common transmission line, second coupling means for coupling said second circuit to the other end of said common transmission line, energy measuring and transferring means in said second means for transferring a measured quantity of electrical energy from said second circuit to said first circuit when it is coupled to said one end of said transmission line, said first circuit including an impedance element having first and second predetermined mutually exclusive impedance values, said impedance element dissipating between successive couplings of said first circuit to said transmission line a proportion of the energy transferred to said first circuit over said transmission line at a dissipating rate which is determined by the individual impedance value thereof, signal transfer means in said first means for transferring a signal from said first circuit to said second circuit when said first circuit is next coupled to said transmission line and which is indicative of the rate of energy dissipation of said impedance element in said first circuit, and said second circuit further including detecting means responsive to said transfer signal for providing an output indicative of the dissipating rate of the impedance element.

10. The system set forth in claim 9 wherein said measuring and transferring means in said second circuit includes a source of reference potential and wherein said second circuit transfers a measured quantity of energy, derived from and determined by the instantaneous potential of said reference potential, to said connected first circuit.

11. The system set forth in claim 9 wherein said detecting means includes means for producing an output signal only in response to the receipt of a transferred signal whose absolute value is greater than a predetermined threshold potential.

References Cited by the Examiner

UNITED STATES PATENTS

| | | | |
|---|---|---|---|
| 2,527,650 | 10/50 | Peterson | 179—15 |
| 2,794,072 | 5/57 | Oswald | 179—15 |
| 2,911,475 | 11/59 | Bray et al. | 179—18 |
| 2,945,094 | 7/60 | Metzger | 179—15 |
| 3,036,161 | 5/62 | Cirone et al. | 179—18 |

ROBERT H. ROSE, *Primary Examiner.*

WALTER L. LYNDE, L. MILLER ANDRUS, *Examiners.*